June 24, 1930.  F. S. CARR  1,768,506
SEPARABLE FASTENER
Filed Feb. 12, 1927
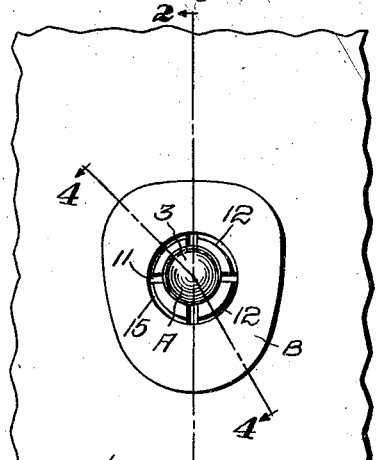
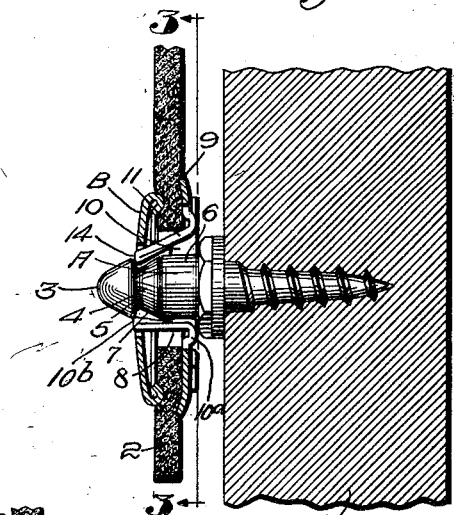
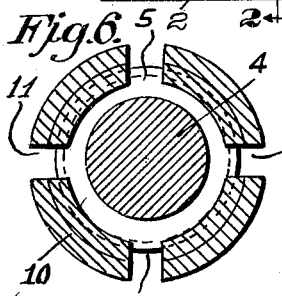
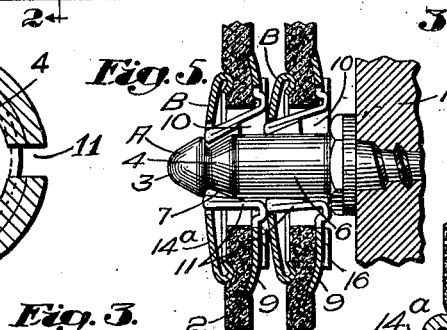
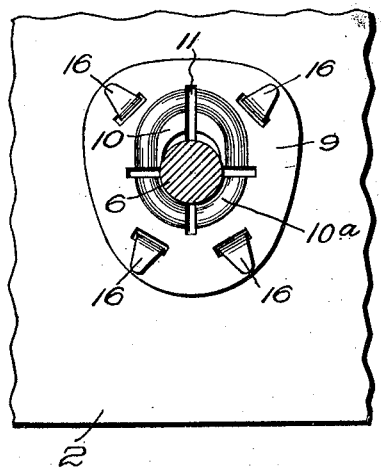
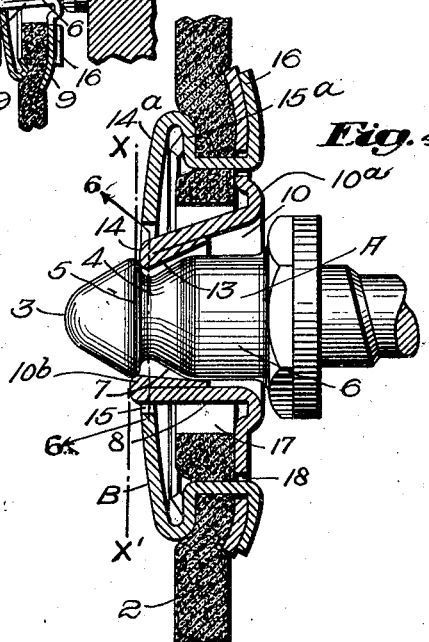
Inventor:
Fred S. Carr Patented June 24, 1930

1,768,506

UNITED STATES PATENT OFFICE

FRED S. CARR, OF NEWTON, MASSACHUSETTS; MOSES F. CARR, EXECUTOR OF SAID FRED S. CARR, DECEASED, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER

Application filed February 12, 1927. Serial No. 167,675.

My invention aims to provide improvements in separable fasteners, primarily, though not exclusively, of the three-side lock type.

In the drawings, which illustrate a preferred embodiment of the invention:—

Figure 1 is a front elevation of the stud and socket assembly;

Fig. 2 is a section taken on the line 2—2 of Fig. 1, but showing the stud in elevation;

Fig. 3 is a section taken on the line 3—3 of Fig. 2, showing the stud-engaging boss closely embracing the shank of the stud at three sides while being spaced away at the fourth side;

Fig. 4 is an enlarged section taken on the line 4—4 of Fig. 1;

Fig. 5 is a section showing a relatively long stud with two sockets engaged therewith; and Fig. 6 is an enlarged section taken on the line 6—6 of Fig. 4 to show the cooperative engagement between the socket and the abrupt shoulder back of the head of the stud, a dotted line being shown to indicate approximately where the abrupt shoulder leaves off and the rounded portion of the head begins.

Referring to the drawings, I have shown a three-side lock fastener installation which includes a stud member A secured to a support 1 (which may be the body of an automobile or the like), and the socket B secured to the flexible carrying medium 2 (which may be the curtain of a motor vehicle or the like).

The stud member A has a head 3, a neck 4, an abrupt shoulder 5 between the head and neck, a shank 6 and a generally tapering shoulder 7 connecting the neck and shank.

The socket is simple in construction, being formed in two pieces. It is so constructed that it is particularly adapted to cooperate with a stud having an abrupt shoulder between its head and neck, such as the shoulder 5, shown in Figs. 2 and 4 of the drawings.

One of the socket pieces, which I will call the stud-engaging part 8, is pressed out of a single piece of metal and has a base portion 9, from which is pressed a boss portion 10. The boss portion is divided by a plurality of slits 11 into a number of resilient portions 12 to permit expansion and contraction of the boss portion 10 when engaging with or disengaging from a stud. The boss portion 10 is oval shaped in cross-section at the inner end $10^a$ adjacent to where it joins the base portion 9 (Figs. 3 and 4), and tapers toward the outer end $10^b$ where it is circular in cross-section as shown by Figs. 3 and 4. The material at the outer end $10^b$ of the boss portion 10 is bent inwardly upon itself (Figs. 2 and 4) to provide a wall 13, substantially longer than the neck of the stud, for purposes more fully hereinafter described. A stud-engaging face 14 is provided at the outer end $10^b$ of the boss portion 10.

The other socket piece is in the form of an attaching plate $14^a$ having an aperture 15 therethrough, and is provided with an inwardly bent flange $15^a$ at the outer periphery, from which extend a plurality of attaching prongs 16.

When the socket pieces are secured to the carrying medium 2, as shown by Fig. 4, the base portion 9 of the stud-engaging part 8 seats against the inner face thereof and the boss portion 10 passes through an aperture 17. The attaching plate 14 is located at the opposite side of the carrying medium 2 and the prongs pierce the carrying medium, pass through slots 18, and are then clinched outwardly and downwardly against the base portion 9 of the stud-engaging part 8.

At the out-set of the description of the three-side locking means operable to lock the fastener members against separation except by manipulation at a predetermined side, I wish to make it clear that there is three-side locking engagement between the face 14 at the outer or rounded end $10^b$ of the boss portion 10 and the shoulder 5 of the stud member as shown in Figs. 4 and 6. Furthermore, there is three-side locking engagement between the wall 13 of the boss portion 10 and the shank 6 of the stud at a point remote from the engagement between the face 14 and the shoulder 5.

I shall now describe more in detail the cooperation between the parts which provide the three-side locking means referred to immediately above. When the stud and socket are engaged (Figs. 1 and 2), the outer or rounded end 10$^b$ of the boss portion 10 is eccentric with relation to the head of the stud so that the stud engaging face 14 seats behind and contacts with the abrupt shoulder 5 of the stud A at the upper side of the boss portion 10 and for substantial portions of the sides of the shoulder of the stud when the relation of the fastener members is as illustrated in the drawings. Thus, it may be said that there is substantial three-side locking engagement between the shoulder 5 and the face 14. The abrupt shoulder 5 and the abrupt face 14 are prevented from engagement at the fourth side (Figs. 4 and 6) by that portion of the inturned wall 13 which spans the neck 4 and engages the shank 6 of the stud. Therefore, the contact at the fourth side is between the rounded edge of the face 14 and the rounded portion of the head 3 of the stud.

The fact that the wall 13 spans the neck 4 causes the eccentric relation between the outer or rounded end 10$^b$ of the boss portion 10 of the socket and the head 3 of the stud is clearly shown in Figs. 1 and 6.

The close cooperation between the wall 13 at the fourth or lower side of the boss portion 10 as viewed in the drawings, particularly in Figs. 3 and 4, with the shank 6 of the stud and along the sides of the shank prevents tipping of the socket relative to the stud by outward forces inserted upon the socket above the center of the boss portion 10. As the boss portion 10 is oval shaped at the inner end 10$^a$, the upper side thereof is spaced from the shank and therefore may be moved toward the shank when the socket is tipped by an outward pull exerted at the bottom or fourth side. Furthermore, the wall 13 closely contacts with and follows the shape of the boss portion 10 and therefore is oval shaped in cross-section adjacent to the point where the shank 6 and neck 4 are joined. This permits a portion of the wall 13 to enter the space provided by the neck at the other three sides, thereby to permit the three-side cooperative engagement between the face 14 and the shoulder 5 as shown in Figs. 4 and 6. It should be noted that the outer or rounded end 10$^b$ of the boss portion 10 terminates in a plane which is at an angle with relation to the plane of the base portion 9 as best illustrated by the broken line $x$—$x$ shown on Fig. 4. This is for the purpose of lengthening the fourth side of the boss so that it may contact with the rounded portion of the head of the stud as shown in Fig. 4; otherwise, there would be no contact at the fourth side unless the socket should be permitted to be tipped at an angle with relation to the axis of the stud when engaged therewith.

The fastener is locked against separation by lateral stresses and against separation by outward stresses exerted at three sides by the cooperation between the substantial engagement between the face 14 and the shoulder 5 and the relatively close fitting of the inner surface of the boss portion 10 with the three sides of the shank 6 of the stud as shown in Fig. 3. The fourth side of the inner surface of the boss portion 10, which in the drawings is illustrated as the top side, is spaced away from the shank (Figs. 3 and 4) and permits tipping of the socket B relative to the stud A when an outward pull is inserted upon the carrying medium 2 adjacent to the bottom of the socket.

When separating the fastener, the resilient portions of the boss yield and permit pulling off over the head because the fourth side engagement of the face 14 is only slight and takes place at a point between the rounded portion of the head 3 and shoulder 5 (Fig. 4) to permit disengagement of the fastener by a pull exerted adjacent to that side.

In Fig. 5, I have shown a relatively long stud C which is the same as the stud A except that the shank 6 is long enough to accommodate a second socket. The socket already described is sufficiently yieldable and is so proportioned that it may be pressed over the shank 6. Such engagement takes place by forcing the ends of the resilient portions over the tapering shoulder. This shoulder easily spreads them apart so that they may ride over the shank as shown. The second socket may then be engaged with the stud in the usual manner.

This arrangement permits a single stud to care for the fastening of two curtains, where they overlap, without any change in the construction of the socket elements.

My invention is not limited to the particular illustrations and description set forth, it being best described in the following claims.

Claims:

1. A three-slide lock fastener comprising a stud member having a head, a neck, a shoulder between said head and said neck, said shoulder being partly rounded and partly abrupt, and a shank portion, a cooperating socket including a stud-engaging part presenting a hollow boss provided with a stud passage therethrough and being substantially oval-shaped in cross-section at one end to closely embrace the shank of the stud at three sides while being spaced away at the fourth side to permit tipping of the socket out of engagement with the stud, said boss being substantially circular in cross-section at the opposite end, an end face at the circular end of said boss for cooperative engagement with the abrupt portion of the shoulder between the neck and head of the stud at substantially three sides and means provided as a part of said boss for cooperation with said stud to permit engagement at the fourth side with the rounded portion of the shoulder only, thereby permitting separation of the fastener by a pull at the fourth side only.

2. A three-side lock fastener comprising, in combination, a stud having a head, a neck, a shank portion and an abrupt shoulder between said head and said neck, a co-operating socket including a stud-engaging part and means for securing it to a suitable stud-carrying medium, said stud-engaging part presenting a boss portion of substantial length surrounding a stud receiving aperture, said boss portion presenting at one end a stud-engaging face adapted to engage the abrupt shoulder of the stud at substantially three sides, means provided by said boss portion for holding the fourth side of said face out of substantial engagement with said abrupt shoulder to permit separation of the fastener by a pull adjacent said fourth side and cooperating three-side locking means provided by said boss at a point remote from its free end for cooperation with the shank of the stud to prevent substantial tipping of the socket relative to the stud except when pulled at said fourth side.

3. A three-side lock fastener comprising, in combination, a stud having a head, a neck, a shank portion and an abrupt shoulder between said head and said neck, a cooperating socket including a stud-engaging part and means for securing it to a suitable stud-carrying medium, said stud-engaging part presenting a boss portion of substantial length surrounding a stud-receiving aperture and yieldable at all sides, said boss portion having at one end a stud-engaging face adapted to engage the abrupt shoulder of the stud at substantially three sides, an inwardly bent wall portion of substantial length formed within said boss adjacent to its outer end, to span the neck of the stud and engage the shank to hold the fourth side of said face from substantial engagement with the abrupt shoulder to permit separation of the fastener by a pull at that side and other means cooperating between the stud and the socket to prevent substantial tipping of the socket relative to the stud except when pulled at said fourth side.

4. A fastener socket including two plates adapted to be secured to opposite sides of a carrying medium, one of said plates having a boss which is oval in cross-sectional outline adjacent to said plate and circular in cross-sectional outline at the other end, said boss being divided into a plurality of resilient fingers thereby permitting expansion and contraction of said boss at all sides thereof, each finger having a shoulder engaging face at the circular end of the boss for engagement with a shoulder presented by a stud, and means located within said boss intermediate its ends for engagement with the shank of a cooperating stud to hold the socket in an eccentric relation with the stud when engaged therewith, thereby to prevent substantial engagement between the shoulder engaging faces provided by some of the fingers and the shoulder of the stud at a predetermined side of the socket.

5. A fastener socket including two plates adapted to be secured to opposite sides of a carrying medium, one of said plates presenting a boss divided into a plurality of resilient fingers each having a shoulder engaging face at one end for engagement with a shoulder presented by a stud, a wall yieldable at all sides and surrounding an aperture through said socket, said wall being adapted closely to embrace three sides of the shank of a stud while being spaced away at the fourth side thereby to permit tipping of the socket at one side only when engaged with a stud, and said wall being adapted to hold the socket in an eccentric relation with a cooperating stud when engaged therewith thereby to prevent substantial engagement between said shoulder engaging face and the shoulder of the stud at one side of the socket while providing for substantial engagement at the other three sides.

6. A three-side lock fastener comprising, in combination, a stud having a head, a neck, a shank portion and an abrupt shoulder between said head and said neck, a cooperating socket including a stud-engaging part and means for securing it to a suitable stud-carrying medium, said stud-engaging part presenting a resilient boss portion of substantial length expansible and contractible at all sides and presenting at its outer end a stud-engaging face for substantial engagement with the shoulder of said stud at three sides thereof, and inwardly bent portions of substantial length presented by said boss portion for preventing complete engagement of the outer end portion of said boss portion with said neck and preventing engagement of the stud-engaging face of the boss portion with the abrupt shoulder at the fourth side.

7. A separable fastener comprising, in combination, a stud having a head, a neck, a shoulder between said head and said neck, and a shank portion, a cooperating socket including a stud-receiving part presenting a boss portion expansible and contractible at all sides and having an aperture through which the stud passes so that the head of the stud lies beyond the outer end of the boss portion, the extreme outer end of said boss portion being adapted to engage the shoulder of said stud, and means adapted to keep at least a portion of said outer end from locking engagement with said shoulder and the said boss portion providing three-side locking means at a point remote from its free end for cooperation with the shank of the stud to prevent substantial tipping of the socket relative to the stud except when pulled at a predetermined side thereof.

In testimony whereof, I have signed my name to this specification.

FRED S. CARR.